June 11, 1968  D. A. KURZ  3,387,392
ABACUS WITH MECHANICAL MEANS FOR HOLDING
UNIT COUNTERS IN POSITION
Filed Dec. 30, 1965

Inventor
Donald A. Kurz

000
United States Patent Office 3,387,392
Patented June 11, 1968

3,387,392
ABACUS WITH MECHANICAL MEANS FOR
HOLDING UNIT COUNTERS IN POSITION
Donald A. Kurz, 617 Illinois Road,
Lake Forest, Ill. 60045
Filed Dec. 30, 1965, Ser. No. 518,766
1 Claim. (Cl. 35—33)

ABSTRACT OF THE DISCLOSURE

The invention resides in the provision of an abacus designed particularly for use in teaching where the counter carrying rods are positioned vertically and wherein counters slidable on said rods are frictionally held against gravity in any position on the rod to which they are moved. The frictional means consists of a spring inserted in a hole bored laterally in each counter and surmounted by a ball bearing to engage one of the rods.

My invention relates to improvements in the operation of the abacus, which is a Chinese device used for arithmetical calculations. It consists of a frame on which is placed rods with slidable counters. In demonstrating the use of the abacus to a class, the counters can be jostled out of the desired position, and the demonstration is thereby spoiled.

The purpose of this invention is to overcome this disadvantage and to provide a means for the counters of the abacus to remain in a stationary, upright position after they are moved to that position by the operator.

Figure 1:
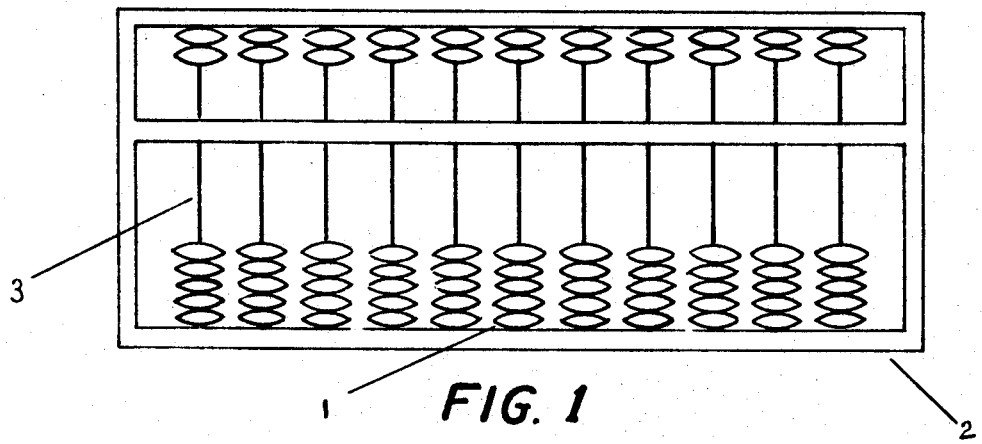
Figure 2:
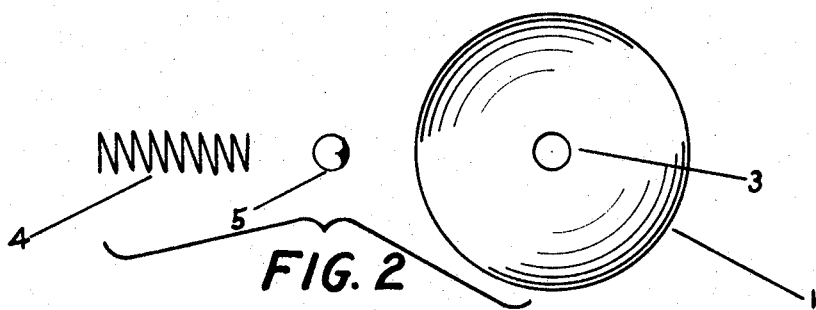
Figure 3:
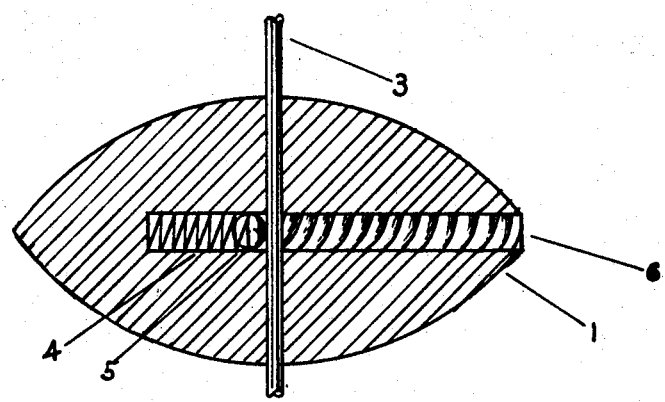

For the purpose of attainment of these and other objects as may appear pertinent, I have shown an embodiment of my invention in the accompanying drawings:

FIGURE 1 is a front elevation view of the abacus.
FIGURE 2 is the abacus counter assembly.
FIGURE 3 is a cross-section of the abacus counter.

The operation of my invention is thus: First, a hole is bored horizontally approximately three-fourths of the way through the counter. In this bored hole a small helical spring is inserted, and in front of the spring, and closest to the rod 3, a ball bearing 5 which is slightly larger than the spring 4, to allow the bearing to be cupped, is placed. The spring 4 with the positioned bearing 5 is compressed sufficiently to allow the rod to slide through the vertical counter on which it moves. The tension exerted by the compressed spring keeps the counter 1 in any desired position. The bearing serves to allow the counter to move easily and smoothly on the rod with the slightest touch and in a desired position. The amount of tension exerted by the spring is determined by the depth of the hole. The optimum tension desired is to allow the counter to be moved with the slightest touch of the operator's finger, and still have the counter remain in position as placed. The hole is then plugged at the open end. All the counters 1 are then placed on the rods 3 in this manner.

Trials of apparatus embodying this invention established that a skilled operator is able to perform the abacus operations with approximately the same speed as on a smaller desk abacus. My invention makes a large vertically-placed abacus operationally possible and is beneficial for class demonstrations of the abacus.

I claim for this invention:

1. In an abacus, a frame, a series of cylindrical parallel rods held thereby, counters slidably mounted and completely encompassing and surrounding the rods on which are mounted, each counter having a hole bored laterally approximately three fourths through its diameter with a helical spring and ball bearing contained in the innermost parts of the hole, said ball bearing being spring-pressed for engagement with one of the rods to frictionally hold the counter in any desired vertical position.

References Cited

UNITED STATES PATENTS

| 232,482 | 9/1880 | Fitch | 35—33 |
| 2,654,164 | 10/1953 | Seidenberg | 35—33 |
| 3,151,404 | 10/1964 | Schott | 35—33 |
| 3,172,214 | 3/1965 | Aberge et al. | 35—35 XR |

EUGENE R. CAPOZIO, *Primary Examiner.*
W. H. GRIEB, *Examiner.*